(12) United States Patent
Musuluri

(10) Patent No.: US 10,783,195 B2
(45) Date of Patent: Sep. 22, 2020

(54) SYSTEM AND METHOD FOR CONSTRUCTING SEARCH RESULTS

(71) Applicant: Aravind Musuluri, Birmingham, AL (US)

(72) Inventor: Aravind Musuluri, Birmingham, AL (US)

( * ) Notice: Subject to any disclaimer, the term of this patent is extended or adjusted under 35 U.S.C. 154(b) by 0 days.

(21) Appl. No.: 15/212,171

(22) Filed: Jul. 15, 2016

(65) Prior Publication Data

US 2017/0017725 A1 Jan. 19, 2017

Related U.S. Application Data

(60) Provisional application No. 62/192,685, filed on Jul. 15, 2015.

(51) Int. Cl.
*G06F 16/9535* (2019.01)
*G06F 16/93* (2019.01)
*G06F 16/248* (2019.01)
*G06F 16/2457* (2019.01)

(52) U.S. Cl.
CPC ........ *G06F 16/9535* (2019.01); *G06F 16/248* (2019.01); *G06F 16/24578* (2019.01); *G06F 16/93* (2019.01)

(58) Field of Classification Search
CPC ......... G06F 17/30867; G06F 17/30398; G06F 17/30507
USPC ....................................................... 707/706
See application file for complete search history.

(56) References Cited

U.S. PATENT DOCUMENTS

| | | | |
|---|---|---|---|
| 8,510,325 B1 * | 8/2013 | Betz | G06F 16/93 707/769 |
| 9,753,909 B2 * | 9/2017 | Miller | G06F 16/2477 |
| 2015/0154269 A1 * | 6/2015 | Miller | G06F 40/177 715/780 |

* cited by examiner

*Primary Examiner* — Sheree N Brown

(57) ABSTRACT

Methods and Systems to display the results of a search operation are provided. More particularly the invention relates to a method to display search results comprising of key/value pairs.

4 Claims, 7 Drawing Sheets

300 ⬅

| Word | Score | |
|---|---|---|
| | type | 1 |
| 301a — | founded | 8 | — 301b
| 302a — | number of employees | 2 | — 302b
| 303a — | net income | 3 | — 303b
| 304a — | industry | 7 | — 304b
| | founder | 2 |
| | revenue | 1 |

| Key | value | |
|---|---|---|
| 401a — revenue | $92 billion | ~401b |
| population | 1,425,789,000 | |
| 402a — number of employees | 1,876,689 | ~402b |
| track guage | 1676 mm | |
| 403a — train engine horse power | 12,789 hp | ~403b |

FIG. 4

SYSTEM AND METHOD FOR CONSTRUCTING SEARCH RESULTS

CROSS REFERENCE TO RELATED APPLICATION

This application claims priority to U.S. Provisional Application Ser. No. 62/192,685 entitled "System And Method Constructing Search Results" filed on Jul. 15, 2015, which is incorporated herein by reference.

TECHNICAL FIELD

The present disclosure generally relates to search engine operations and method to construct results of a search operation. Particularly, the disclosure relates to constructing search results comprising of key/value pairs.

BACKGROUND

It is commonly required in the field of Information Technology to provide a service that searches through data sources. The data source herein may refer to data and/or document(s) on the Internet, intranet, storage devices, and so on. In order to use a search engine, a user seeking information on a desired topic generally inputs a search query consisting of keyword(s) or phrase(s) relevant to the topic into the search interface of the search engine. In response, the search engine typically displays a report with a prioritized list of links pointing to relevant documents containing the search keywords. Oftentimes, a short summary of text i.e., extract/snippet is also included for each result. The extract/snippet is that portion or portions of the text in the document that contain the keywords from the search query.

For a search result, if the relevant section of the document comprising the search keyword(s) is in the form of key/value pairs, search engines while constructing the extract may include key/value pair(s) that contain the search keyword(s) along with additional surrounding key/value pairs. Often times, the surrounding key/value pairs may not be useful to the user. The search result may contain other key/value pairs that may not be next to the key/value pairs comprising the search keyword(s) but may be much more useful to the user. The user might in fact be unaware of such useful information in the document.

In view of the above drawbacks, there remains a need to provide useful information to the user in addition to the relevant portions of a document in a search result page. Thus, there is a need to construct search results for a search query which are informative, relevant and useful to the user.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

According to the aspects related herein, the disclosure relates to a method of displaying results of a search operation on at least one data source, wherein said results comprise key/value pairs; said method comprising (a) accepting a search query (b) identifying documents matching the search query wherein a relevant portion of the document matching the search query comprises key/value pairs (c) Identifying key/value pair(s) in the document(s) of remarkable value(s) and/or key/value pairs in the document(s) of high popularity key(s); (d) returning the search results to a user comprising the identified key value pairs.

In a preferred embodiment, the identified key/value pairs do not contain the search query.

In another aspect of the present disclosure is provided with a system comprising search engine unit. The search engine unit may comprise one or more logics configured to perform the functions and operations associated with the above-disclosed methods.

In another aspect of the present disclosure is provided a computer program product executable in a memory of a search engine unit

BRIEF DESCRIPTION OF THE DRAWINGS

FIG. 3 depicts exemplary words and corresponding score values based on historical search queries stored in a storage unit.

FIG. 4 illustrates exemplary key and corresponding values of remarkable value stored in a storage unit.

DETAILED DESCRIPTION

Figure 1:
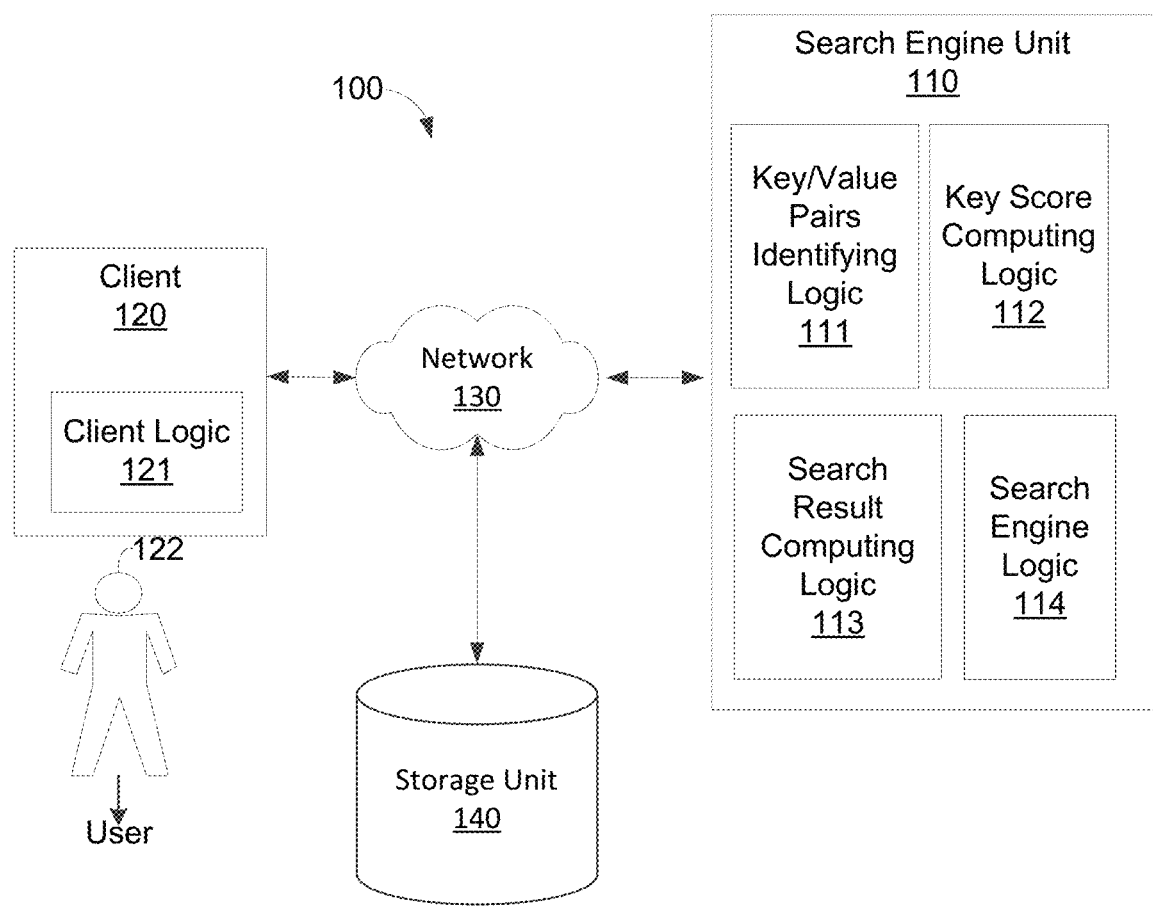
FIG. 1 is a block diagram illustrating an exemplary search environment in accordance with an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to searching and returning links to any document containing text and optional presentation semantics (the look and feel instructions) such as, but not limited to, HTML, DHTML, XML, SGML, PDF, E-mail, Microsoft® Word documents, Microsoft® Power point documents, news group postings, multimedia objects and/or Shockwave Flash files.

Through the length of the specification and claims, the words "extract" and "snippet" are used interchangeably.

FIG. 1 depicts a search environment 100 in accordance with an exemplary embodiment of the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present invention. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The search engine unit 110 may be a dedicated or shared server including but not limited to any type of application server, database server, or file server configurable and combinations thereof. The search engine unit 110 and the client 120 may include, but are not limited to, a computer, handheld unit, mobile unit, consumer electronic unit, or the like.

The exemplary search engine unit 110 comprises key/value pairs identifying logic 111, key score computing logic 112, search result constructing logic 113 and search engine logic 114.

In the exemplary search engine unit 110, the key/value pairs identifying logic 111 may be configured to identify key/value pairs present within sections of a document. The key/value pairs identifying logic is also configured to identify key/value pairs with a remarkable value.

The search engine unit 110 further comprises the key score computing logic 112. The key score computing logic 112 may be configured to compute scores for the keys identified by the key/value pairs identifying logic 111. The score for a key may be computed based on the popularity of the words comprising the key within a data source, historical queries, or the like. For example, in one embodiment, the score for a key may be the count of documents within a data source within which the words comprising the key occurs. The scores are further explained with respect to FIG. 3.

The search engine unit 110 further comprises the search result constructing logic 113. The search result constructing logic 113 may be configured to construct a search result. If the relevant section of the document for a search query comprises of key/value pairs, the search result constructing logic 113 may select the key/value pairs of remarkable value and/or high popularity key to be part of the search result.

Figure 6:
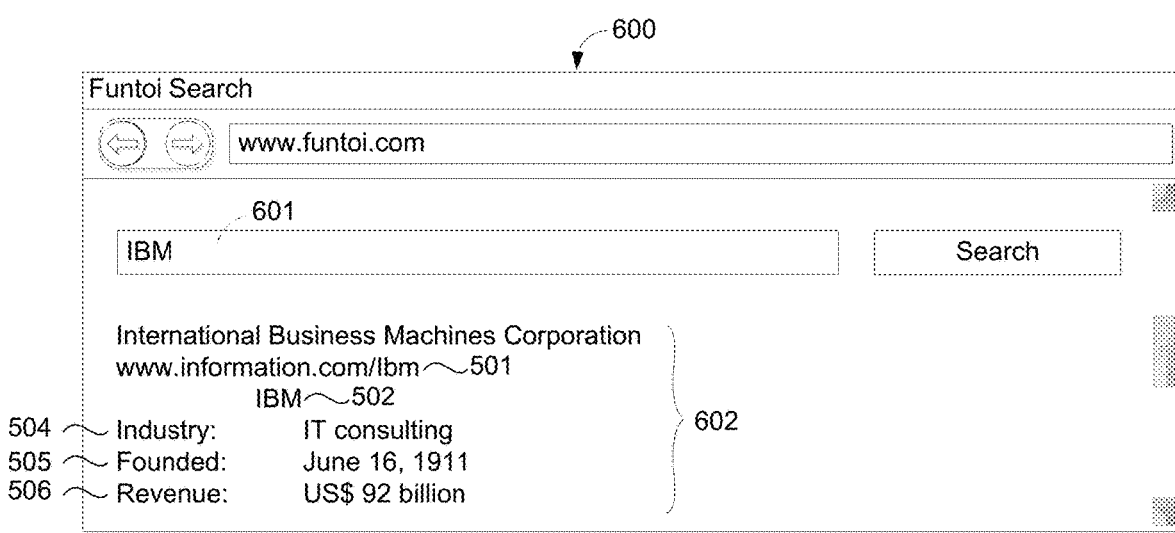
FIG. 6 depicts an exemplary search result in accordance with an embodiment of the present disclosure.

The process of constructing search result is further explained in FIG. 6.

The search engine unit 110 further comprises the search engine logic 114. The search engine logic 114 may identify documents relevant to a search query.

The storage unit 140 is configured to store information associated with constructing search results, or the like. In various embodiments, such information may include, without limitation, domains, URLs, documents, webpages, websites, indexes, word popularity, historical search queries, remarkable data, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable, may include any information relevant to search results and computing key/value pair(s), storing user search history, and the like. The content and volume of such information are not intended to limit the scope of embodiments of the present disclosure in anyway. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. The single unit depictions are meant for clarity, not to limit the scope of embodiments in any form.

A user 122 through the client logic 121 on the client 120 may enter a search query comprising of keyword(s) which may identify the type of information that the user is interested in retrieving. The client logic 121 may comprise, for example, an Internet browser; however, other types of client logic 121 for interfacing with the user 122 and for communicating with the search engine unit 110 may be used in other embodiments of the present disclosure. The client logic 121 transmits the user search query to the search engine unit 110 via the network 130. Upon receiving the user search query the search engine unit 110 compiles a prioritized list of search results comprising of key/value pairs of remarkable value and/or high popularity key and returns search results to the client logic 121 which displays the results to the user 122 in a window.

Figure 2:
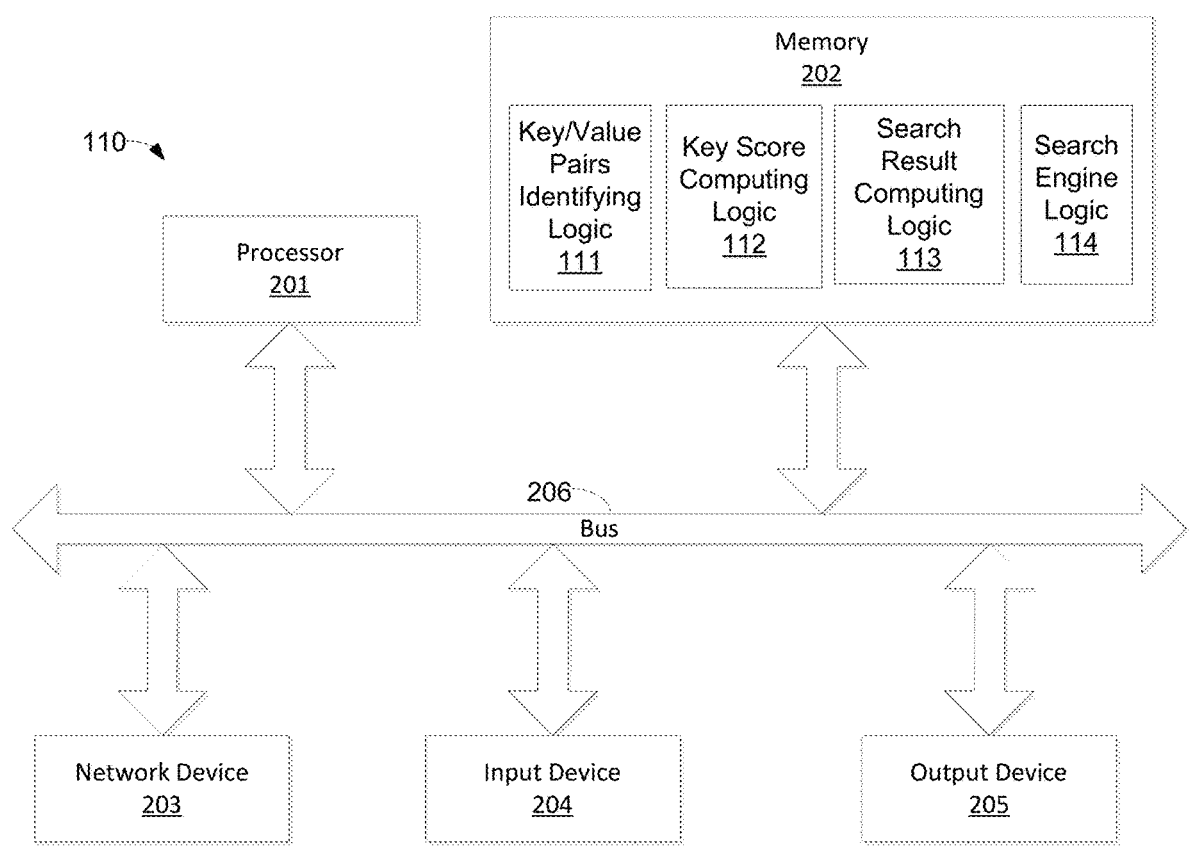
FIG. 2 is a block diagram of an exemplary computing device of FIG. 1.

In some preferred embodiments, the search engine unit 110 is shown in FIG. 2. It should be noted, however, that embodiments are not limited to implementation on such computing devices, but may be implemented on any of a variety of different types of computing units within the scope of embodiments hereof. The search engine unit 110 (as shown in FIG. 1) is only one example of a suitable computing/search environment and it is not intended to suggest any limitation as to the scope of use or functionality of the disclosure.

In some embodiments, the search engine unit 110 may include a bus 206, a processor 201, memory 202, network device 203, input device 204, and an output device 205. Bus 206 may include a path that permits communication among the components of the search engine unit 110.

The search engine unit 110 (FIG. 1) stores the key/value pairs identifying logic 111, the key score computing logic 112, the search result constructing logic 113 and the search engine logic 114 as software in memory 202.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The processor 201 comprises processing hardware for interpreting or executing tasks or instructions stored in memory 202. Note that the processor 201 may be a microprocessor, a digital processor, or other type of circuitry configured to run and/or execute instructions.

The network device 203 may be any type of network unit (e.g., a modem) known in the art or future-developed for communicating over a network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input device 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of search engine unit 110 (FIG. 1) are performed by multiple computing units communicatively coupled to the network.

Further note that, the search engine unit 110 (FIG. 1) components may be implemented by software, hardware, firmware or any combination thereof. In the exemplary search engine unit 110, depicted by FIG. 1, all the components are implemented by software and stored in memory 202.

FIG. 3 depicts exemplary data 300 comprising words and a score corresponding to each word based on the count of historical queries within which the word occurs. The data 300 may be precomputed and stored in the storage unit 140 (FIG. 1) and made available to the key score computing logic 112 (FIG. 1).

The word "founded" 301*a* occurs 8 times within historical queries (now shown) and hence its score is 8 301*b*. In one embodiment, multiple occurrences of a word within a single query may be treated as a single occurrence.

In one embodiment, certain words occurring in sequence may be treated as one word. For example, the words "net" and "income" occurring in sequence may be treated as one word. In the exemplary data 300, the word sequences 302*a* and 303*a* are treated as one word. The word sequence "net income" 303*a* occurs 3 times within historical queries (not shown) and hence its score is 3 303*b*.

In one embodiment, score for a key is the greatest, least or average of the word scores comprising the key. In yet another embodiment, certain commonly occurring words such as, but not limited to, "a", "an", "of", "an", "to", "for" are ignored in key score computation.

FIG. 4 illustrates exemplary data 400 comprising of keys and corresponding remarkable values. The data 400 may be precomputed by comparing all the similar key values in a data source and for each similar key identifying the highest and lowest values as remarkable values and stored in the storage unit 140 (FIG. 1) and made available to the key/value pairs identifying logic 111 (FIG. 1).

For example, the value "$92 billion" 401*b* is the highest value among all the "revenue" keys 401*a* occurring within all the documents of a data source. Hence 401*b* is a remarkable value for the key 401*a*.

Note that lowest value zero may not be considered as remarkable value. Further note that if a bunch of similar keys have the same highest or lowest values, the value may not be considered remarkable.

In one embodiment, remarkable values for similar keys may be restricted based on the category. For example, for the key "revenue" there may be a remarkable value for "government" category and another remarkable value for "companies" category.

Figure 5:
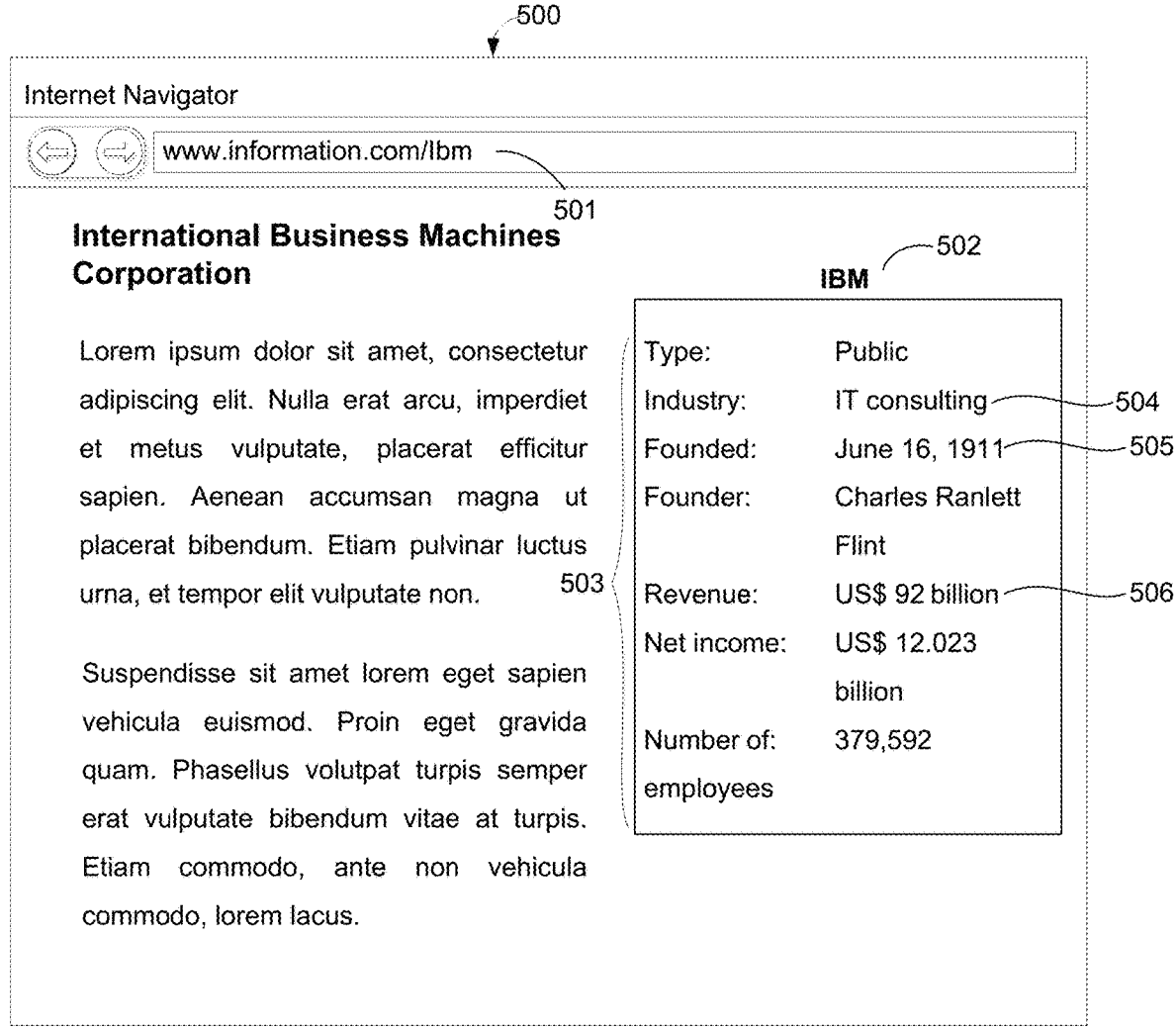
FIG. 5 illustrates an exemplary document comprising of key/value pair(s).

FIG. 5 is a diagram illustrating a portion of a document 500 identified by the URL 501. The document comprises key/value pairs section 503 with corresponding title 502.

FIG. 6 depicts an exemplary GUI 600 with a portion of search results that are displayed to the user 122 (FIG. 1) by the client logic 121 (FIG. 1) with selected key/value pairs as a result of an exemplary search query "IBM" 601.

Upon receiving the search query 601, the search engine logic 114 (FIG. 1) may identify document 500 (FIG. 5) as a relevant document and section 503 (FIG. 5) as a relevant section. The key/value pairs identifying logic 111 (FIG. 1) may identify the individual key/value pairs within the section 503 (FIG. 5). The key/value pairs identifying logic 111 (FIG. 1) may further identify the key/value pair 506 (FIG. 5) as comprising of a remarkable value by matching the key and value with the 401*a* (FIG. 4) key and 401*b* (FIG. 4) value. The key score computing logic 112 (FIG. 1) may identify a score for each key within the key/value pairs identified by the key/value pairs identifying logic 111 (FIG. 1) and sort the key/value pairs by the key score. The score for the key of the key/value pair 505 is the highest. The score for the key of the key/value pair 504 is the second highest. The search result constructing logic 113 (FIG. 1) constructs the search result 602 comprising of the key/value pairs 504, 505 and 506.

Figure 7:
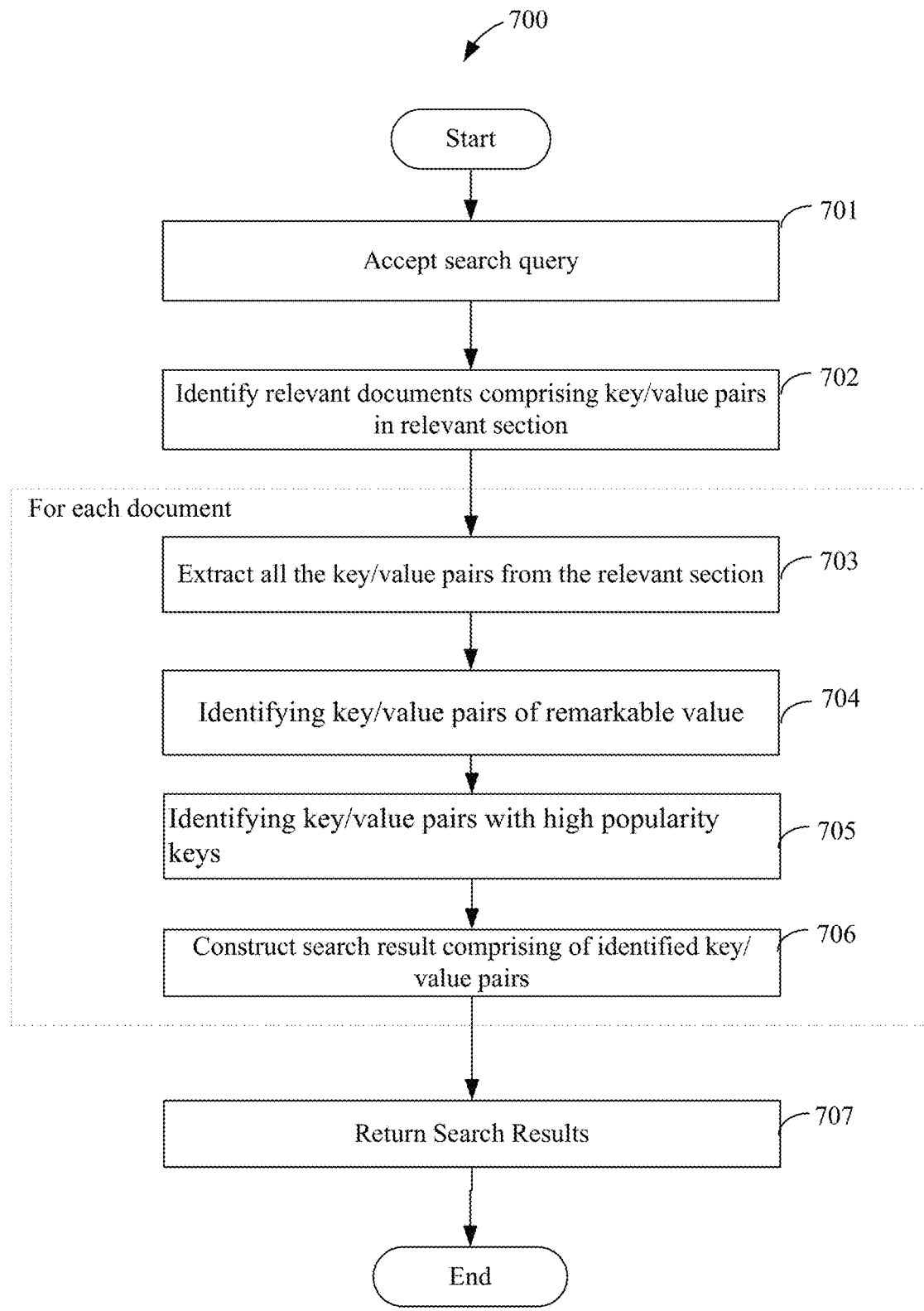
FIG. 7 is a flow diagram of a method of constructing an extract comprising of key/value pair(s) in accordance with an embodiment of the present disclosure.

FIG. 7 is a flow chart illustrating a method in accordance with the present disclosure. In step 701, a user 122 (FIG. 1) may enter a search query. In step 702, upon receiving the search query, the search engine unit 110 (FIG. 1) may identify relevant documents comprising of key/value pairs in relevant section. Steps 703 through 706 are performed for each relevant document. In step 703, the key/value pairs identification logic 111 (FIG. 1) may identify key/value pairs from each relevant section of the document. In step 704, the key/value pairs identification logic 111 (FIG. 1) may identify key/value pairs with a remarkable value. In step 705, the key score computing logic 112 (FIG. 1) may compute scores for each extracted key in the key/value pair and identify key/value pairs with high popularity. Further in step 706, the search result constructing logic 114 (FIG. 1) may construct search result comprising of identified key/value pairs. Later in step 707, the computed search results are returned to the user 122 (FIG. 1).

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

The invention claimed is:

1. A method executable on a computing device comprising a processor and memory to display results of a search operation on at least one data source comprising documents stored in memory, said method comprising:
    a. accepting a search query comprising keyword(s) from a client;
    b. in response to accepting the search query, identifying, by a processor, documents from a data source stored in memory comprising of key/value pair(s) in a section relevant to the search query;
    c. constructing a search result, by the processor, for at least one identified document comprising of an extract from the key/value pair(s) in the relevant section of the document;
    d. constructing the search result extract from the key/value pair(s) in the relevant section by identifying and selecting key/value pair(s) comprising of remarkable value(s) and/or computing by the processor scores for key(s) of the key/value pair(s) based on popularity of the key(s) and selecting key/value pair(s) with high key scores; and e. returning the search result comprising the search extract to the client.

2. The method as in claim 1, wherein the key/value pairs of remarkable value are identified based on notable information stored in a database regarding said key/value pairs.

3. The method as in claim 1, wherein the score of a key of a key/value pair is computed by the processor based on count of occurrences of the key within historical search queries.

4. The method as in claim 1, wherein the score of a key of a key/value pair is computed by the processor based on count of occurrences of the key within the documents of the data source.

* * * * *